United States Patent
McIntyre

(10) Patent No.: US 7,353,918 B1
(45) Date of Patent: Apr. 8, 2008

(54) BRAKE ASSEMBLY FOR A BICYCLE

(76) Inventor: John McIntyre, P.O. Box 4054, Traverse City, MI (US) 49684

( * ) Notice: Subject to any disclaimer, the term of this patent is extended or adjusted under 35 U.S.C. 154(b) by 0 days.

(21) Appl. No.: 11/137,722

(22) Filed: May 25, 2005

Related U.S. Application Data

(63) Continuation-in-part of application No. 10/640,601, filed on Aug. 13, 2003, now Pat. No. 6,899,202.

(51) Int. Cl.
  *B62L 5/20* (2006.01)
(52) U.S. Cl. .................... 188/24.14; 188/24.12
(58) Field of Classification Search .. 188/24.11–24.22, 188/72.7, 72.9
See application file for complete search history.

(56) References Cited

U.S. PATENT DOCUMENTS

| | | | | |
|---|---|---|---|---|
| 3,727,727 | A | * | 4/1973 | Hauth .................. 188/72.9 |
| 3,860,094 | A | * | 1/1975 | Breton ................. 188/24.14 |
| 3,989,124 | A | | 11/1976 | Fujii |
| 4,055,235 | A | * | 10/1977 | Tanaka et al. .......... 188/24.14 |
| 4,061,206 | A | | 12/1977 | Wood |
| 4,333,550 | A | * | 6/1982 | Shirai ................. 188/72.2 |
| 4,560,033 | A | * | 12/1985 | DeWoody et al. ......... 188/2 F |
| 4,854,425 | A | * | 8/1989 | Sevadio ................ 188/72.2 |
| 4,974,704 | A | * | 12/1990 | Miller et al. ............ 188/24.14 |
| 5,431,257 | A | * | 7/1995 | Rocca et al. ............ 188/24.21 |
| 5,501,301 | A | | 3/1996 | Nishimura |
| 6,148,964 | A | | 11/2000 | Huang |
| 6,264,008 | B1 | | 7/2001 | Jordan |
| 6,318,513 | B1 | | 11/2001 | Dietrich |
| 6,491,137 | B2 | | 12/2002 | Lumpkin |
| 2003/0168292 | A1 | | 9/2003 | Kuo |

OTHER PUBLICATIONS

John M. Vranish, Flex Wedges, Goddard Space Flight Center, www.masatech.com/BRIEFS.
Press Release Apr. 18, 2004 Hermes Award, eStop Gmbh, Grafrath, Germany.
eBrake—The Mechationic Wedge Brake, Henry Hartman et al, SAE Paper 2002-01-2582.
Modelling and Validation of the Mechationic Wedge Brake, Richard Roberts et al, SAE Paper 2003-01-3331.

* cited by examiner

*Primary Examiner*—Chris Schwartz
(74) *Attorney, Agent, or Firm*—Barbara M. Burns

(57) ABSTRACT

A novel brake assembly is provided for a bicycle. The assembly is composed of an arrangement of a pair of brake pads each connected to a rod member in turn guided for axial movement by a base fixed on the bicycle frame. A bifurcated control cable actuates wedge members causing movement of the pads against a wheel rim. Return springs on the rod members cause the assembly to return to the original non-braking position in response to release of the control cable. As an option, a second wedge action can be incorporated that is activated by the frictional forces generated from the contact of the brake pads with the wheel rim. The second wedge action is limited by a mechanical stop within the brake assembly to prevent jamming of the brakes.

6 Claims, 4 Drawing Sheets

BRAKE ASSEMBLY FOR A BICYCLE

This application is a continuation-in-part of application Ser. No. 10/640,601 filed Aug. 13, 2003 now U.S. Pat. No. 6,899,202.

BACKGROUND OF THE INVENTION

The field of the invention pertains to bicycle brakes and, in particular, to brakes which act upon the rims of bicycle wheels.

Such brakes have traditionally been caliper brakes which squeeze the rim between a pair of brake pads. Other traditional bicycle brakes are coaster brakes which are located on the bicycle wheel hub and engage the hub and axle.

Caliper brakes may be side pull, center pull or direct pull, depending on the location of the control cable in the connection to the caliper mechanical parts. Traditionally made of metal except for the brake pads, engineered plastics are now becoming part of the caliper mechanisms. Unfortunately, caliper brakes are prone to misalignment with frequent hard use. When misaligned, the brake pads do not smoothly and evenly engage the wheel rims.

U.S. Publication Document 2003 0168292 discloses a bicycle brake assembly with a wedge shaped end on a brake pad and grooves in the pads. U.S. Pat. No. 6,318,513 discloses an electrically actuated mechanical friction brake that utilizes a significant portion of the vehicle dynamic energy to apply the brake and a mechanism to prevent jamming of the brake. An electronic publication entitled "Flex Wedges" available at www.nasatech.com/Briefs/Octo1/ from the National Aeronautics and Space Administration discloses a flexible wedge configuration that engages a groove to perform a brake or clutch function.

SUMMARY OF THE INVENTION

With a view toward overcoming the disadvantages of caliper brakes, applicant has developed brakes wherein the brake pads move linearly into and out of engagement with the wheel rim. The new bicycle brakes aim at providing brakes with a simple structure for easy assembly. The brakes require few parts and are relatively easy to manufacture with little need for adjustment after assembly.

Each brake pad is mounted on a rod which moves linearly through a sleeve bearing. Complementary wedge members relatively movable along an inclined engagement surface cause the rod and brake pad to move back and forth out of and into engagement with the wheel rim. A retraction spring urges the rod and brake pad out of engagement with the wheel rim. A manually actuateable cable is connected to one of the wedge members to actuate the brake.

The complementary wedge members automatically compensate for brake pad wear in normal use. When brake pad wear exceeds compensation limits, thicker wedge members may be substituted in a simple manner without tools or disassembly of other components of the brake assembly.

As an option for further increasing the brake force applied to the wheel rim, a second wedge action that is actuated by the frictional forces generated from the contact of the brake pads with the wheel rim can be incorporated. The second wedge action is limited by a mechanical stop within the brake assembly to prevent jamming of the brakes.

Although all the new brake components, with the exception of the brake pads, may be conveniently made from common metals, most of the new brake components are particularly suitable for engineered plastics, such as mechanical grade TEFLON®.

DESCRIPTION OF THE PREFERRED EMBODIMENTS

Figure 1:
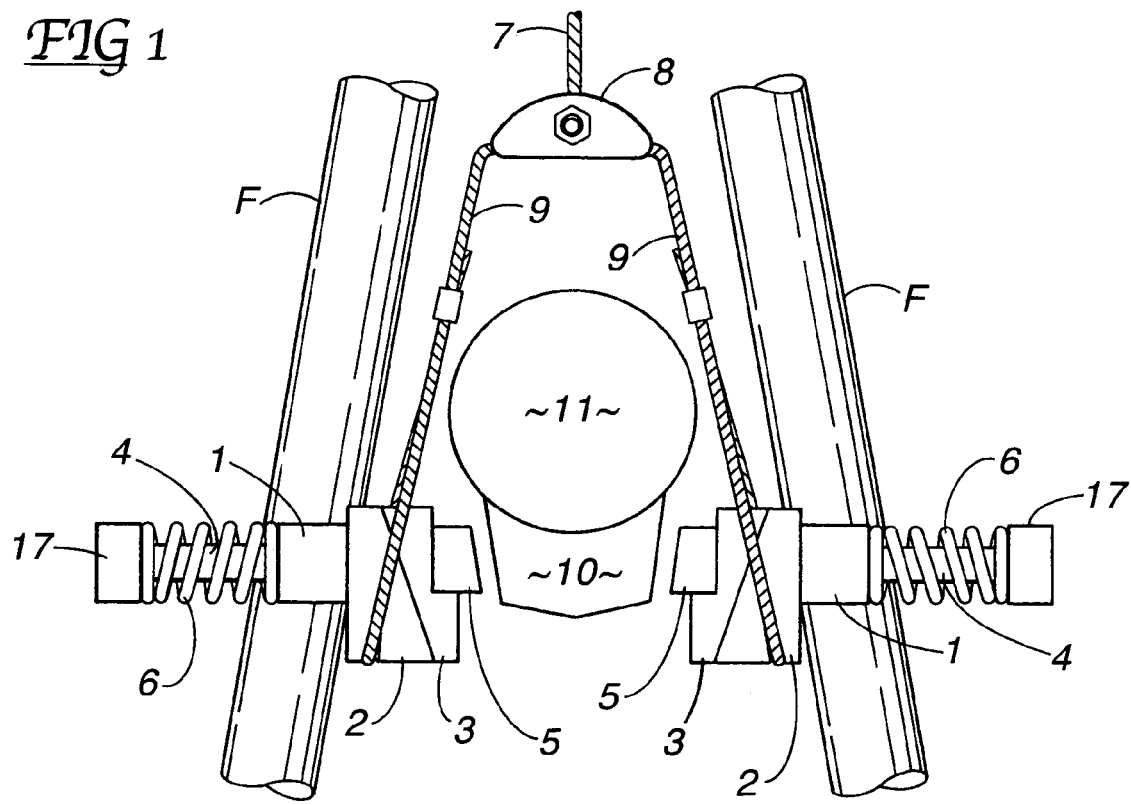
FIG. 1 is a front view of the new brake assembly in non-braking position with a portion of the bicycle frame or fork in background.
Figure 2:
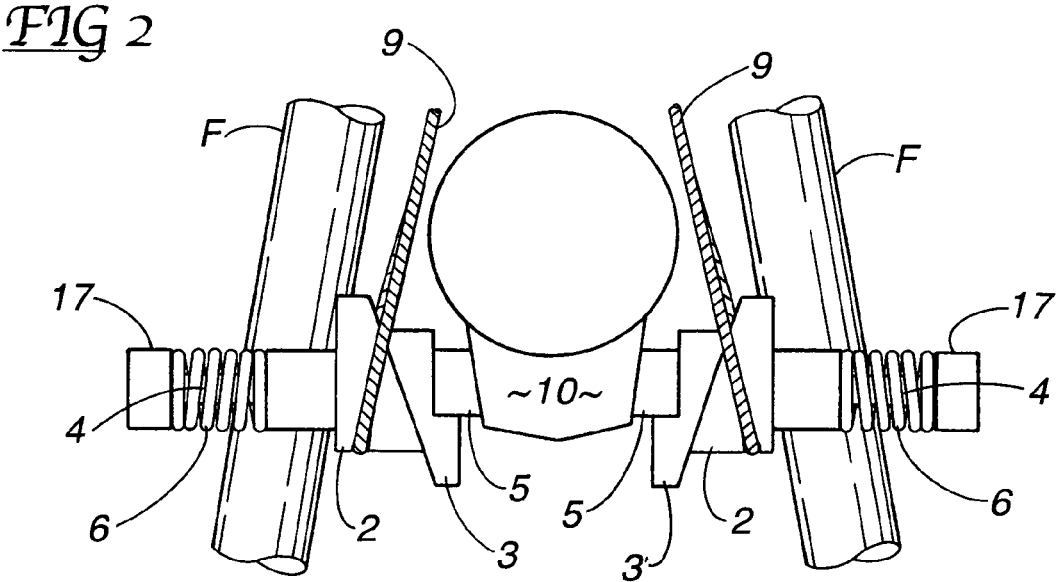
FIG. 2 is a front view of the new brake assembly in braking position with a portion of the bicycle frame or fork in background.

Referring to the drawings, in FIGS. 1 and 2 a pair of fixed bases 1 are rigidly attached to a pair of bicycle frame or fork members therebehind generally denoted by "F." The rigid attachment of each base 1 may be by welding or any suitable mechanical attachment that can withstand the considerable forces applied during hard braking. The bases 1 are aligned with the wheel rim 10 of the wheel 11.

Immediately adjacent and in vertical sliding engagement with each base 1 are a pair of spreading wedges 2 actuateable by vertically movable cables 9. In biased sliding contact with the spreading wedges 2 are a pair of complementary wedges 3. The complementary wedges 3 support and retain the brake pads 5 in position near the bicycle wheel rim 10 and tire 11, as shown in FIG. 1, or in contact with the rim 10 in FIG. 2. When the user operates the brake, cable 7 moves upwardly raising the bridge 8 and, in turn, cables 9 and the spreading wedges 2. The upward movement of wedge 2 causes rod 4 to move axially, compressing spring 6 and driving brake pad 5 against the rim 11.

Figure 3:
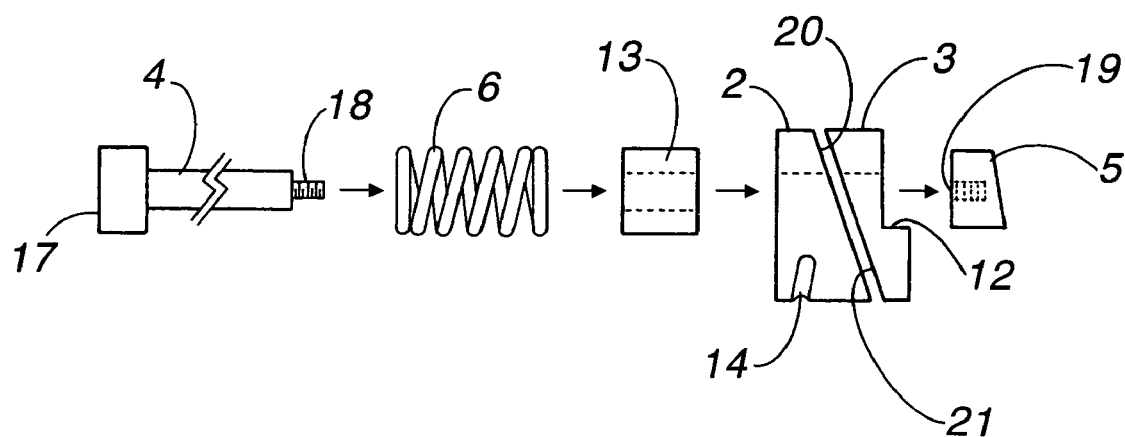
FIG. 3 is an exploded view of one of the brake pad actuators.

Rods 4 having heads 17 pass through each base 1 to each side of the wheel rim 10. As best shown in FIG. 3, each rod 4 includes a threaded tip 18 engageable with a threaded hole 19 in the back of the brake pad 5. Each rod 4 passes through spring 6, sleeve bearing 13, spreading wedge 2 and complementary wedge 3. Each sleeve bearing 13 is press fitted within a base 1, thus supporting and aligning the brake assembly on the bicycle.

Complementary wedge 3 includes a step 12 which supports the brake pad 5 in proper tangential alignment with respect to the wheel rim 10. The surfaces 20 and 21 of the spreading wedges 2 and complementary wedges 3 retain the tangential alignment through the spreading wedges to the cables 9 which, in turn, loop around and engage the spreading wedges in cable grooves 14. The spring 6, by urging the head 17 of the rod 4 away from the base 1, keeps all of the movable brake assembly parts engaged together and aligned with the sleeve bearing 13 through which rod 4 passes.

The mechanical stress upon the spreading wedge 2 during brake actuation is placed upon the cross-section of the wedge at the groove 14 by the cable 9 rather than going through the wedge, which could create a weak point and potential mechanical failure.

Figure 4A:
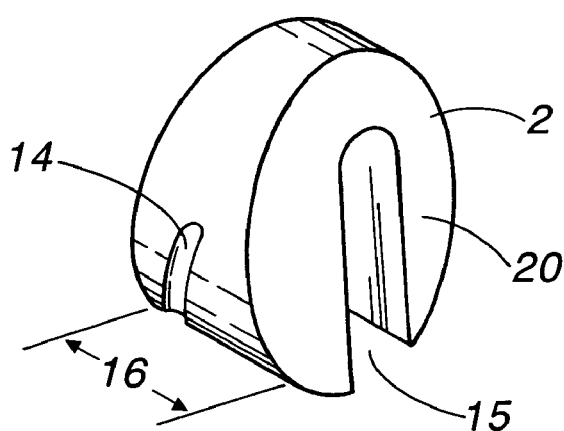
FIG. 4A is a detail of the radially movable wedge.
Figure 4B:
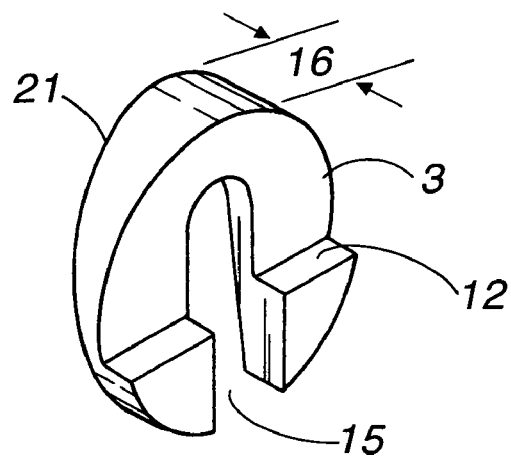
FIG. 4B is a detail of the axially movable wedge.

In FIGS. 4A and 4B, a spreading wedge 2 and a complementary wedge 3 are shown separate from the mechanism. Each wedge 2 and 3 includes a slot 15 to provide for a quick and tool-free removal of the wedges and brake pads 5 when the wheel 11 and rim 10 are removed. The tool-free removal also provides for interchangeability with other wedges of increased thickness 16 to accommodate brake pad 5 wear.

Both wedges 2 and 3 can be easily constructed from metal or plastic rod stock by forming groove 14, boring and slotting to form slot 15, forming step 12 at the rod end, cutting the rod on the bias to form surfaces 20 and 21 and wedge 3 and finally cutting the rod perpendicularly to complete wedge 2.

The angle of the confronting surfaces 20 and 21 of the spreading wedge 2 and the complementary wedge 3 has a profound effect on performance. Moderate angles will cause the wedges 2 and 3 to return to rest position quickly and with less spring 6 load than steeper angles and with less brake lever travel and consequent cable pull. However, braking performance will suffer, causing the user to squeeze very hard on the levers to apply the brakes.

Steep angles will provide increased stopping power but require greater spring 6 load to retract the wedges 2 and 3 and require significant lever travel and cable pull to actuate the brakes. Hence; greater stopping power is offset by increased spring load and lever travel. The confronting surface angle for optimum performance not only takes into account spring 6 load and lever travel but also the variables of brake pad composite, wheel rim material and coating.

The new brake design facilitates the use of polymer materials in the construction of the wedges 2 and 3 and is an option for rod 4 and other components, such as the bridge 8. In particular, mechanical grade Teflon or other plastics having low friction coefficient properties provide low surface friction when the spreading wedge 2 ascends and descends to move brake pad 5. With these modern plastics, machined or molded polymer parts can be cheaply mass produced. The polymer parts also weigh less than metal parts, an advantage in a weight obsessed performance market.

Tests of prototype brakes show that less mechanical effort is required than side and center pull conventional brakes. The new brakes provide smooth, even uniform braking pressure with less human effort because of the linear movement of the mechanism in contrast with the lateral movement in existing caliper brakes. Less effort is enhanced by the low surface friction of mechanical grade polymers. A safe anti-locking well-balanced braking force offers safety in contrast with direct-pull cantilevers that have been found in many cases to be excessive in stopping power and require special hand levers.

The new brakes have a particular compactness and can be assembled and disassembled easily. Simply depressing the head 17 and rod 4 with a thumb while canting and pressing the complementary wedge 3 upward will allow the wedge 3 to be removed, resulting in the proper clearance for wheel removal from the bicycle frame. Assembly is easy by again depressing the head 17 and rod 4 and then inserting the wedge 3 downward against the spreading wedge 2. Releasing the external pressure locks the assembly together. Thus, the assembly is held in place by the expansion of the spring 6 when the wedge 3 is either installed or removed.

Where simple disassembly is not as desired, the brake pad 5 could be bonded or otherwise made integral with the complementary wedge 3 and the rod 4 affixed to the wedge 3. This would eliminate any special metal or plastic brake pad holder normally associated with securing a brake pad 5.

Figure 5:
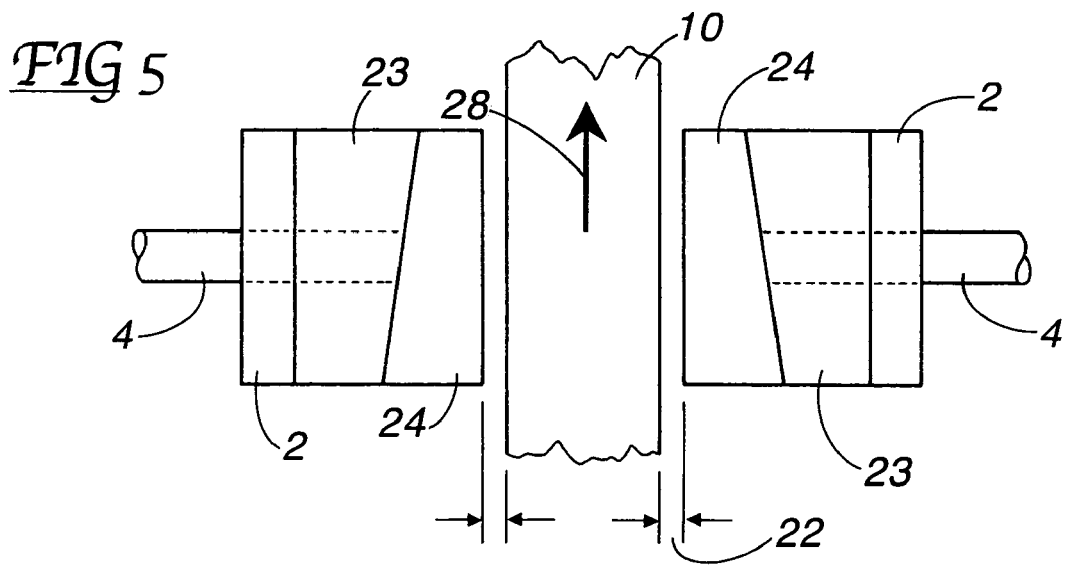
FIG. 5 is a top plan view of the new brake modified for a second wedge action in non-braking position.
Figure 6:
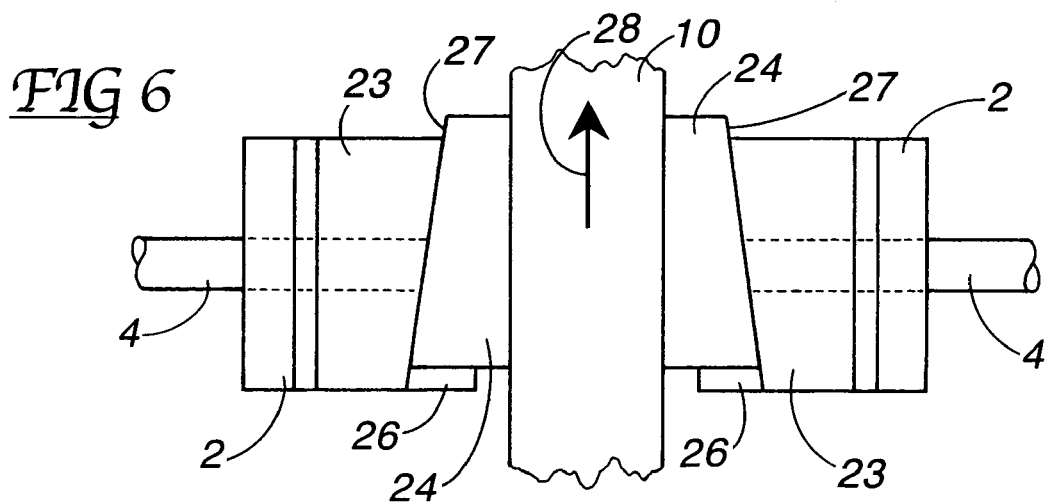
FIG. 6 is a top plan view of the brake of FIG. 5 in braking position.

In FIGS. 5 and 6 the above wedge actuated brake is modified to utilize the forward movement of the bicycle to increase braking by increasing the squeeze pressure applied to the wheel rim 10 after the clearance 22 is closed. As above a first wedge 2 is displaced relative to the rod 4 and second wedge 23 to force brake pad 24 against the rim 10. (Reference numbers that remain the same refer to elements unmodified from FIGS. 1-4).

Figure 7:
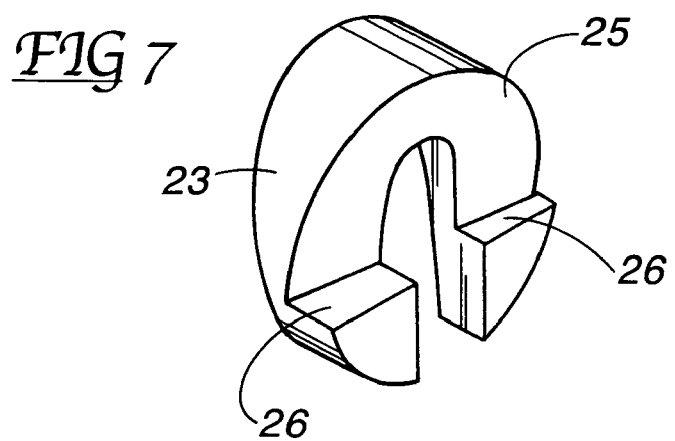
FIG. 7 is a perspective detail of the axially moveable wedge modified for the second wedge action.

Wedge 23 is modified by the oblique or biased surface 25 and step 26 as best shown in FIG. 7. The step 26 supports the brake pad 24 and the biased surface 25 engages a complementary surface 27 on the brake pad. As shown in FIG. 6 the forward motion indicated by arrow 28 of the rim 10 upon engagement of the brake pad 24 causes the brake pad to move in the direction 28 relative to surface 25 and step 26 and wedge more tightly against rim 10. Thus, the effective braking force applied to the rim 10 can be considerably increased without the application of increased force by the bicycle rider.

Figure 8:
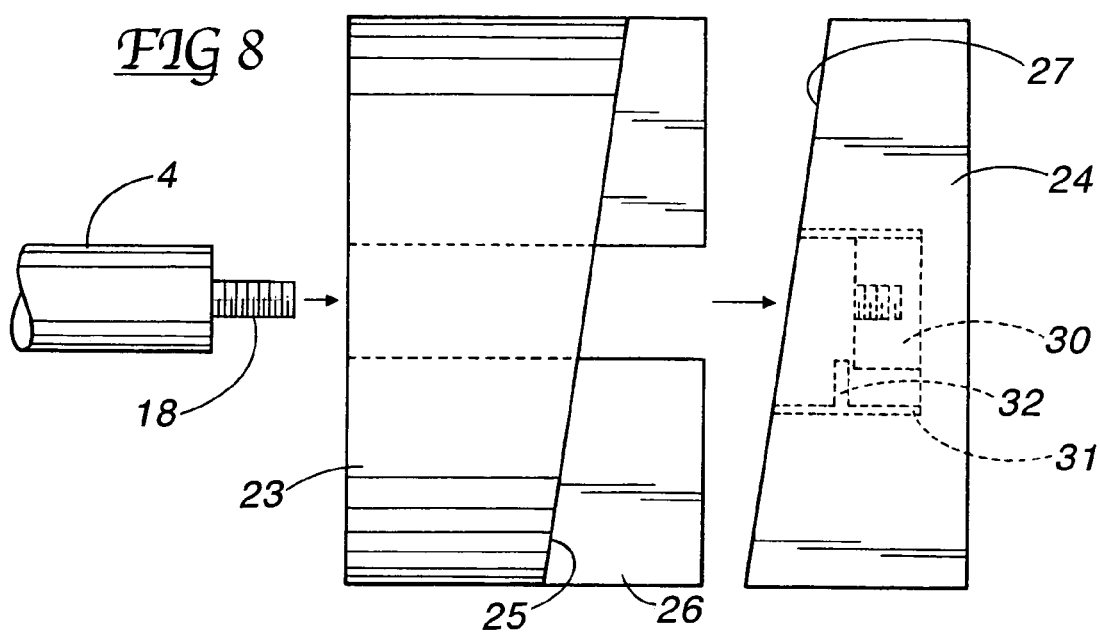
FIG. 8 is an exploded view of the axially moveable wedge and brake pad showing internal details.
Figure 9:
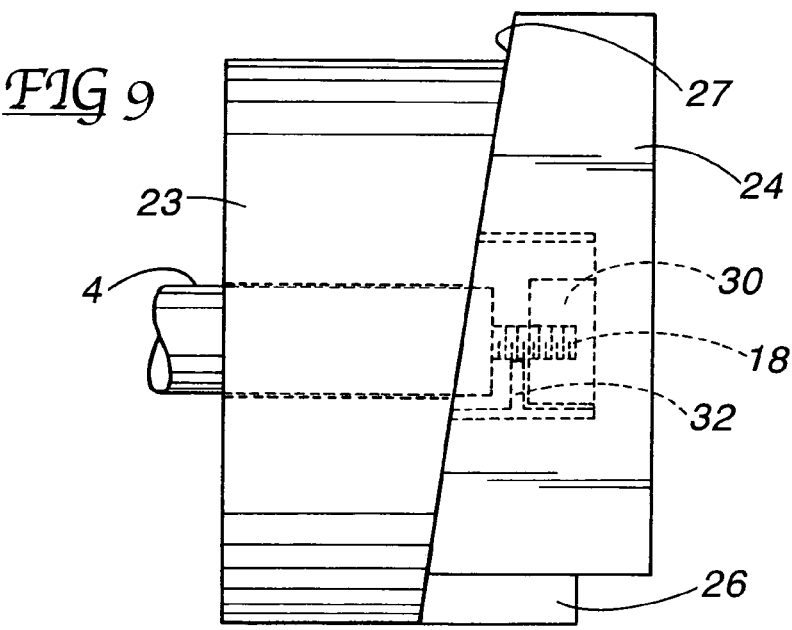
FIG. 9 is a top view of the axially moveable wedge and brake pad in braking position showing internal details.
Figure 10:
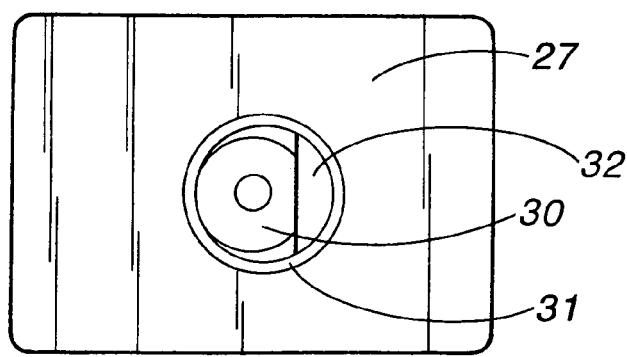
FIG. 10 is a back view of a brake pad for the second wedge action.

The relative movement of brake pad 24 is limited to prevent the brake pad from frictionally locking up with the rim 10. As shown in FIGS. 8-10 the attachment of the rod 4 threaded tip 18 to the brake pad 24 is modified. A bore 29 is formed in the brake pad 24. A nut 30 of substantially smaller size is placed in the bore 29 and a cylinder 31 is press-fitted in the bore. The cylinder 31 contains a flange 32 to retain the nut 30 in the bottom of the bore 29. The rod 4 passes through the wedge 23 and the tip 18 is threaded into the nut 30.

A comparison of the nut 30 position in FIG. 8 with the nut position in FIG. 9 makes clear that as the brake pad 24 slides on wedge 23, nut 30 has a limited range of travel within cylinder 31. Thus, the relative movement of brake pad 24 on wedge 23 is limited and the added braking force on the rim 10 is limited to prevent jamming.

The invention claimed is:

1. A bicycle brake comprising
a pair of bases rigidly affixable to a bicycle, guide means on the bases and a pair of rods in engagement with the guide means for linear movement of the rods relative to the bases,
a pair of first wedges mounted on each rod and frictionally engaging means slideably mounted on each first wedge,
a pair of second wedges each in sliding engagement with a first wedge and a base whereby movement of the second wedges cause movement of the first wedges and rods relative to the bases and upon frictional engagement with a bicycle wheel causes movement of the frictionally engaging means relative to the first wedges.

2. The bicycle brake of claim 1 including means to limit the movement of the frictionally engaging means relative to the first wedges.

3. The bicycle brake of claim 1 wherein the movement of the second wedges is substantially perpendicular to the movement of the frictionally engaging means.

4. A bicycle brake for applying a squeezing force to retard movement of a bicycle wheel, comprising:

a pair of opposed rods, means on each rod for frictionally engaging a bicycle wheel, said frictionally engaging means movable between an open non-braking position and a closed braking position, first wedge members in slideable engagement with each frictionally engaging means, said wedge members each having means thereon to direct the slideable relative movement of the frictionally engaging means in the same direction as the bicycle wheel movement at the location of frictional engagement, and second wedge members slideably engageable with each first wedge member, said second wedge members moveable radially relative to the axes of the rods.

5. The bicycle brake of claim 4 wherein the slideable engagement between each first and second wedge members comprise planar surfaces oblique to the axes of the rods.

6. The bicycle brake of claim 5 wherein the sliding movement of the second wedge member relative to the first wedge member is substantially perpendicular to the sliding movement of the frictionally engaging means relative to the first wedge member.

* * * * *